US012774219B2

(12) United States Patent
Yubuchi et al.

(10) Patent No.: US 12,774,219 B2
(45) Date of Patent: Oct. 27, 2026

(54) POSITIVE ELECTRODE ACTIVE MATERIAL PARTICLE, LITHIUM ION SECONDARY BATTERY AND METHOD FOR PRODUCING POSITIVE ELECTRODE ACTIVE MATERIAL PARTICLE

(71) Applicant: TOYOTA JIDOSHA KABUSHIKI KAISHA, Toyota (JP)

(72) Inventors: So Yubuchi, Shizuoka-ken (JP); Jun Yoshida, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 629 days.

(21) Appl. No.: 18/326,483

(22) Filed: May 31, 2023

(65) Prior Publication Data

US 2023/0402600 A1 Dec. 14, 2023

(30) Foreign Application Priority Data

Jun. 14, 2022 (JP) ................................ 2022-096020

(51) Int. Cl.
*H01M 4/525* (2010.01)
*C01G 53/502* (2025.01)
(Continued)

(52) U.S. Cl.
CPC .......... *C01G 53/51* (2025.01); *C01G 53/502* (2025.01); *H01M 4/0471* (2013.01); (Continued)

(58) Field of Classification Search
CPC ..... C01G 53/50; C01G 53/82; C01P 2002/60; C01P 2002/72; C01P 2002/76;
(Continued)

(56) References Cited

U.S. PATENT DOCUMENTS

2021/0119207 A1 4/2021 Sugiyama

FOREIGN PATENT DOCUMENTS

JP 2002-313337 A 10/2002
JP 2004-220898 A 8/2004
(Continued)

OTHER PUBLICATIONS

Jun Xiao, et al., "Rational Design of a P2-Type Spherical Layered Oxide Cathode for High-Performance Sodium-Ion Batteries", ACS Cent. Sci., vol. 5, 2019, 1937-1945.
(Continued)

*Primary Examiner* — Victoria H Lynch
(74) *Attorney, Agent, or Firm* — Sughrue Mion, PLLC

(57) ABSTRACT

The rate characteristic of O2-type positive electrode active material particle is improved. The positive electrode active material particle of the first mode have an O2-type structure, comprise at least one transition metal elements from among Mn, Ni and Co, with Li and O, as constituent elements, and are spherical. The positive electrode active material particle of the second mode have at least one shell and at least one void in the cross-sectional structure, wherein the shell has an O2-type structure, the shell comprises at least one transition metal element from among Mn, Ni and Co, with Li and O, as constituent elements, the surface of the shell comprises crystallites, and the void is present along the inner wall of the shell.

4 Claims, 5 Drawing Sheets

(51) Int. Cl.

| | |
|---|---|
| ***C01G 53/51*** | (2025.01) |
| ***H01M 4/04*** | (2006.01) |
| ***H01M 4/36*** | (2006.01) |
| ***H01M 4/505*** | (2010.01) |
| ***H01M 10/0525*** | (2010.01) |
| *H01M 4/02* | (2006.01) |

(52) U.S. Cl.
CPC .......... *H01M 4/366* (2013.01); *H01M 4/505* (2013.01); *H01M 4/525* (2013.01); *H01M 10/0525* (2013.01); *H01M 2004/021* (2013.01); *H01M 2004/028* (2013.01)

(58) Field of Classification Search
CPC ............. C01P 2004/03; C01P 2004/32; C01P 2004/51; C01P 2004/61; C01P 2004/62; C01P 2004/80; C01P 2006/40; H01M 10/0525; H01M 2004/021; H01M 2004/028; H01M 4/0471; H01M 4/366; H01M 4/505; H01M 4/525; Y02E 60/10
See application file for complete search history.

(56) References Cited

FOREIGN PATENT DOCUMENTS

| | | |
|---|---|---|
| JP | 2014-186937 A | 10/2014 |
| JP | 2021-068556 A | 4/2021 |

OTHER PUBLICATIONS

Cui et al., “Structure and Interface Design Enable Stable Li-Rich Cathode”, Journal of the American Chemical Society, 2020, vol. 142, No. 19, pp. 8918-8927, (10 pages total).

Comparative Example (Prior Art)

P2-type particles

POSITIVE ELECTRODE ACTIVE MATERIAL PARTICLE, LITHIUM ION SECONDARY BATTERY AND METHOD FOR PRODUCING POSITIVE ELECTRODE ACTIVE MATERIAL PARTICLE

FIELD

The present application discloses a positive electrode active material particle, a lithium ion secondary battery and a method for producing a positive electrode active material particle.

BACKGROUND

Positive electrode active materials having an O2-type structure are known. A positive electrode active material with an O2-type structure can be obtained by ion-exchange of Li for at least a portion of the Na in a Na-containing transition metal oxide with a P2-type structure, as disclosed in PTL 1.

CITATION LIST

Patent Literature

[PTL 1] Japanese Unexamined Patent Publication No. 2014-186937

SUMMARY

Technical Problem

A positive electrode active material with an O2-type structure has a low rate characteristic, and tends to have lower capacity during high-speed charge-discharge compared to its capacity during slow charge/discharge.

Solution to Problem

The present application discloses the following aspects as means for solving this problem.

(Aspect 1)

A positive electrode active material particle, having an O2-type structure, comprising at least one transition metal element from among Mn, Ni and Co, with Li and O, as constituent elements, and being spherical.

(Aspect 2)

A positive electrode active material particle having at least one shell and at least one void in the cross-sectional structure, wherein the shell has an O2-type structure, the shell comprises at least one transition metal element from among Mn, Ni and Co, with Li and O, as constituent elements, the surface of the shell comprises crystallites, and the void is present along an inner wall of the shell.

(Aspect 3)

The positive electrode active material particle according to aspect 2, wherein the positive electrode active material particle has layered shells, and the void is present at least between one shell and another shell.

(Aspect 4)

The positive electrode active material particle according to aspect 2 or 3, wherein an outer shape of the shell is spherical.

(Aspect 5)

The positive electrode active material particle according to any one of aspects 1 to 4, wherein the surface of the particle comprises crystallites.

(Aspect 6)

The positive electrode active material particle according to any one of aspects 2 to 5, wherein the diameters of the crystallites are less than 1 μm.

(Aspect 7)

The positive electrode active material particle according to any one of aspects 2 to 6, wherein the crystallites have first surfaces exposed on the surface of the particle, and the first surfaces are flat.

(Aspect 8)

The positive electrode active material particle according to any one of aspects 1 to 7, wherein the positive electrode active material particle comprises Li, Mn, Ni, Co and O as constituent elements.

(Aspect 9)

The positive electrode active material particle according to any one of aspects 1 to 8, wherein the positive electrode active material particle has a chemical composition represented by $Li_aNa_bMn_{x-p}Ni_{y-q}Co_{z-r}M_{p+q+r}O_2$ (where $0<a\leq1.00$, $0\leq b\leq0.20$, $x+y+z=1$, and $0\leq p+q+r\leq0.15$, and M is at least one element selected from among B, Mg, Al, K, Ca, Ti, V, Cr, Fe, Cu, Zn, Ga, Ge, Sr, Y, Zr, Nb, Mo and W).

(Aspect 10)

A lithium ion secondary battery having a positive electrode, an electrolyte layer and a negative electrode, wherein the positive electrode comprises the positive electrode active material particle according to any one of aspects 1 to 9.

(Aspect 11)

The lithium ion secondary battery according to aspect 10, wherein the positive electrode comprises an electrolyte solution.

(Aspect 12)

A method for producing positive electrode active material particles, the method including:

obtaining a precursor particle, covering the surface of the precursor particle with a Na salt to obtain a covered particle, firing the covered particle to obtain a Na-containing transition metal oxide particle having a P2-type structure, and replacing at least a portion of the Na in the Na-containing transition metal oxide particle with Li by ion-exchange to obtain the positive electrode active material particle, wherein:

the precursor particle is composed of a salt containing one or more transition metal elements from among Mn, Ni and Co, the precursor particle is spherical, the covered particle is obtained by covering 40 area % or more of the surface of the precursor particle with the Na salt, and the Na-containing transition metal oxide particle is spherical.

Effects

The positive electrode active material particle of the present disclosure has an excellent rate characteristic.

DESCRIPTION OF EMBODIMENTS

1. Positive Electrode Active Material Particle According to First Mode

Figure 1A:
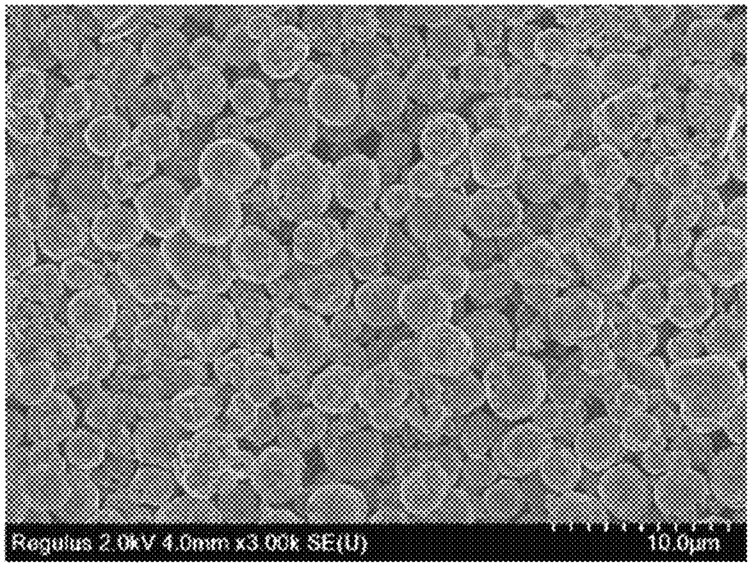
FIG. 1A is a SEM photograph showing exemplary outer shapes of positive electrode active material particles according to a first mode.

FIGS. 1A and B show an example of positive electrode active material particles according to a first mode. The positive electrode active material particle of the first mode:

has an O2-type structure, comprises at least one transition metal element from among Mn, Ni and Co, with Li and O, as constituent elements, and is spherical.

1.1 Particle Crystal Structure

The positive electrode active material particle of the first mode includes at least an O2-type structure (belonging to space group P63mc), as the crystal structure. The positive electrode active material particle of the first mode may also have an O2-type structure while also having a crystal structure other than an O2-type structure. Examples of crystal structures other than an O2-type structure include a T #2-type structure (belonging to space group Cmca) or an O6-type structure (belonging to space group R-3m, with a c-axis length of 2.5 nm to 3.5 nm and typically 2.9 nm to 3.0 nm, and differing from an O3-type structure which also belongs to space group R-3m), formed when Li is intercalated/deintercalated from an O2-type structure. The positive electrode active material particle of the first mode may have an O2-type structure as the main phase, or may have a crystal structure other than an O2-type structure as the main phase. The positive electrode active material particle of the first mode may have a crystal structure for the main phase that changes depending on the state of charge-discharge.

Figure 1B:
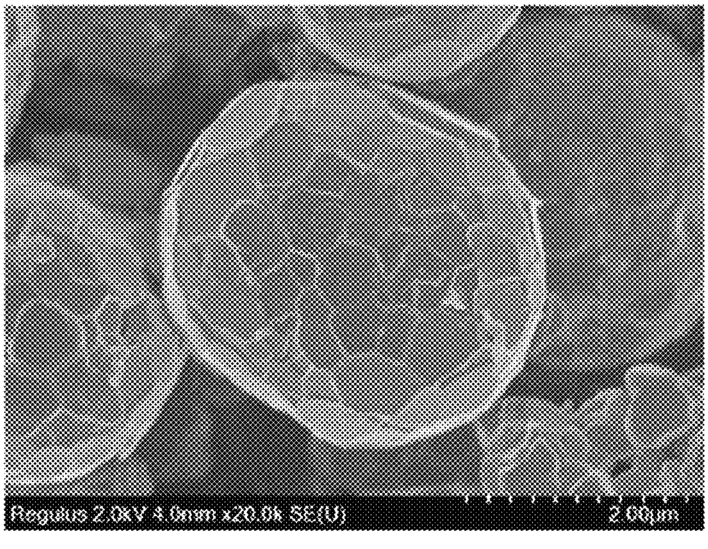
FIG. 1B is a SEM photograph showing exemplary outer shapes of positive electrode active material particles according to the first mode.

The positive electrode active material particle of the first mode may be a single crystal composed of a single crystallite, or may be polycrystalline with multiple crystallites. For example, the positive electrode active material particle of the first mode may have a surface composed of multiple crystallites such as shown in FIG. 1B. That is, the surface of the particle may have a structure with multiple crystallites linked together.

When the surfaces of the positive electrode active material particle comprises crystallites, grain boundaries are present on the particle surface. The grain boundaries can serve as entry and exit points for intercalation. Specifically, having multiple crystallites on the positive electrode active material particle increases entry and exit points for intercalation, lowering the reaction resistance and shortening the lithium ion migration distance so that diffusion resistance is also reduced, and additionally lowers the absolute degree of expansion and contraction during charge-discharge, making cracks less likely to form.

The sizes of the crystallites forming the positive electrode active material particle may be either large or small, but smaller crystallite sizes will result in more grain boundaries, helping to exhibit the aforementioned advantageous effects. For example, higher performance can be more easily obtained if the diameters of the crystallites forming the positive electrode active material particle are less than 1 μm. The “crystallite” and “crystallite diameter” can be determined by observing the surface of the positive electrode active material particle with a scanning electron microscope (SEM) or transmission electron microscope (TEM). Specifically, the surface of the positive electrode active material particle is observed and each enclosed region delineated by grain boundaries is considered to be a “crystallite”. The maximum Feret diameter is calculated for the crystallite, and considered to be the “crystallite diameter”. If the particle is composed of a single crystal, then the particle itself can be considered a crystallite, and the maximum Feret diameter of the particle is the “crystallite diameter”. Alternatively, the crystallite diameter can be determined by EBSD or XRD. For example, the crystallite diameter can be determined from the half-width of a diffraction line in the XRD pattern, using the Scherrer equation. The positive electrode active material particle of the present disclosure will tend to exhibit higher performance if the crystallite diameter is smaller than 1 μm, as determined by any method.

As shown in FIG. 1B, each crystallite may have a first surface exposed on the particle surface, where the first surface is flat. As shown in FIG. 1B, the surface of the positive electrode active material particle may have structure with multiple linked flat sections. During production of the positive electrode active material particle, as explained below, the crystallites are grown on the particle surface until each crystallite is mutually linked with another crystallite, helping to obtain crystallites with flat first surfaces.

1.2 Chemical Composition of the Particle

The positive electrode active material particle of the first mode comprises at least one transition metal element from among Mn, Ni and Co, with Li and O, as constituent elements. If at least Li, Mn, one or more from among Ni and Co, and O are included as constituent elements, and especially if at least Li, Mn, Ni, Co and O are included as constituent elements, then the performance of the positive electrode active material particle of the first mode will tend to be even higher. However, the positive electrode active material particle of the first mode may have a Li abundance of close to 0 since Li is released by charging.

The positive electrode active material particle of the first mode may be one having a chemical composition represented by $Li_aNa_bMn_{x-p}Ni_{y-q}Co_{z-r}M_{p+q+r}O_2$. In this formula, $0<a\leq1.00$, $0\leq b\leq0.20$, $x+y+z=1$, and $0\leq p+q+r\leq0.15$. The letter M represents at least one element selected from among B, Mg, Al, K, Ca, Ti, V, Cr, Fe, Cu, Zn, Ga, Ge, Sr, Y, Zr, Nb, Mo and W. If the positive electrode active material particle has this chemical composition, it will be able to more easily maintain an O2-type structure.

In the chemical composition, "a" may be greater than 0, 0.10 or greater, 0.20 or greater, or greater, 0.40 or greater, 0.50 or greater or 0.60 or greater, and 1.00 or smaller, 0.90 or smaller, 0.80 or smaller or 0.70 or smaller. In the same chemical composition, "b" may be 0 or greater, 0.01 or greater, 0.02 or greater or 0.03 or greater, and 0.20 or smaller, 0.15 or smaller or or smaller. In the same chemical composition, "x" may be 0 or greater, 0.10 or greater, 0.20 or greater, 0.30 or greater, 0.40 or greater or 0.50 or greater, and 1.00 or smaller, 0.90 or smaller, or smaller, 0.70 or smaller, 0.60 or smaller or 0.50 or smaller. In the same chemical composition, "y" may be 0 or greater, 0.10 or greater or 0.20 or greater, and 1.00 or smaller, 0.90 or smaller, 0.80 or smaller, 0.70 or smaller, 0.60 or smaller, 0.50 or smaller, 0.40 or smaller, 0.30 or smaller or 0.20 or smaller. In the same chemical composition, "z" may be 0 or greater, 0.10 or greater, 0.20 or greater or 0.30 or greater, and 1.00 or smaller, 0.90 or smaller, 0.80 or smaller, or smaller, 0.60 or smaller, 0.50 or smaller, 0.40 or smaller or 0.30 or smaller. M will usually be an element that does not participate in charge-discharge. High charge-discharge capacity will be easier to ensure if p+q+r is 0.15 or smaller. The value of p+q+r may be or smaller, or even 0. The composition of 0 is approximately 2, but is variable without being limited to exactly 2.0.

1.3 Particle Shape

The positive electrode active material particle of the first mode is spherical, as shown in FIGS. 1A and B. As used herein, the phrase "particle is spherical" means that the circularity of the particle is 0.80 or greater. The circularity of the positive electrode active material particle may be or greater, 0.82 or greater, 0.83 or greater, 0.84 or greater, 0.85 or greater, 0.86 or greater, or greater, 0.88 or greater, 0.89 or greater or 0.90 or greater. The circularity of a particle is defined as $4\pi S/L^2$. In this formula, S is the orthographic area of the particle, and L is the circumferential length of the orthographic image of the particle. The circularity of the positive electrode active material particle can be determined by observing the outer appearance of the particle using a scanning electron microscope (SEM), a transmission electron microscope (TEM) or an optical microscope. When the positive electrode active material consist of multiple particles, the circularity is measured as an average in the following manner.

(1) First, the particle size distribution of the positive electrode active material particles is measured. Specifically, the 10% cumulative particle diameter (D10) and the 90% cumulative particle diameter (D90), in the volume-based particle size distribution by laser diffraction/scattering, are determined.

(2) The outer appearance of the positive electrode active material particles are observed in an image taken with a SEM, TEM or optical microscope, and 100 particles having a circle equivalent diameter (diameter of a circle having the same area as the orthographic area of the particle) of D10 or greater and D90 or lower as determined in (1) above are arbitrarily selected from among the particles in the image.

(3) The circularity of each of the 100 selected particles is determined by image processing, and the average is considered to be the "circularity of the positive electrode active material particles".

The positive electrode active material particle of the first mode may be a solid particle, a hollow particle or a particle with voids. When the positive electrode active material particle is hollow particle or has voids, they may optionally have the hollow or void section filled with liquid. For example, the electrolyte solution may spread to the interior instead of remaining only on the outer surface of the positive electrode active material particle, tending to increase the contact area between the particle and the solution.

1.4 Particle Size

The size of the positive electrode active material particle of the first mode is not particularly restricted, but smaller size is more advantageous. For example, the mean particle diameter (D50) of the positive electrode active material particles of the first mode may be 0.1 μm to 10 μm, 0.5 μm to 8.0 μm or 1.0 μm to 6.0 μm. The mean particle diameter (D50) of the positive electrode active material particles is the 50% cumulative particle diameter (D50, median diameter) in the volume-based particle size distribution determined by laser diffraction/scattering.

1.5 Effect (Comparison with Conventional O2-Type Positive Electrode Active Material Particle)

Figure 2:
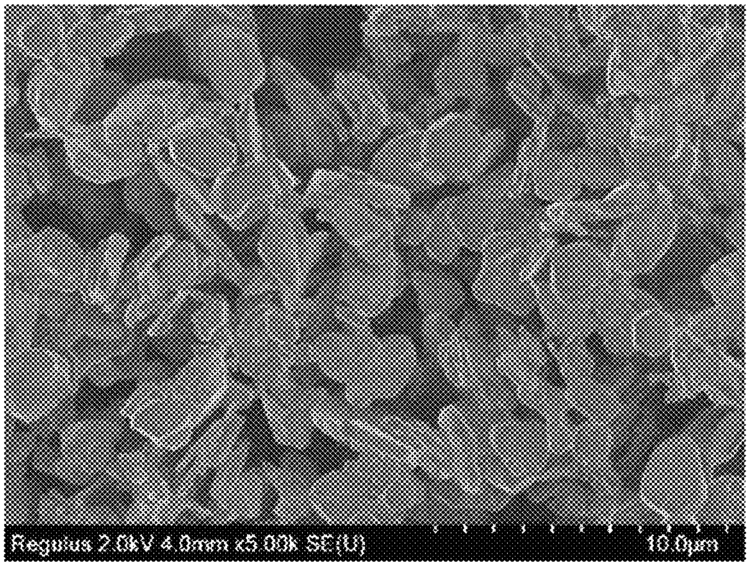
FIG. 2 is a SEM photograph showing O2-type positive electrode active material particles according to the prior art.

FIG. 2 shows the shapes of O2-type positive electrode active material particles of the prior art. The positive electrode active material particle with an O2-type structure can be obtained by ion-exchange of Li for at least a portion of the Na in a Na-containing transition metal oxide particle having a P2-type structure. A P2-type structure is hexagonal with a large Na ion diffusion coefficient, tending to produce crystal growth in a specific direction. If the transition metal element in the P2-type structure includes one or more from among Mn, Ni and Co, then crystal growth will be promoted in a laminar manner in a specific direction. For Na-containing transition metal oxide particle having a P2-type structure, therefore, it has only been possible in the prior art to produce laminar form with a high aspect ratio with crystal growth direction biased in a specific direction, and as a result, for positive electrode active material particle having an O2-type structure as well, it has only been possible to produce laminar form of the type shown in FIG. 2. Laminar growth of a P2-type structure follows a basic principle and has been considered unavoidable. Conventionally, therefore, O2-type positive electrode active material particle has been assumed to be laminar, and improvement in its performance as an active material has been achieved by controlling the chemical composition or crystal structure.

In contrast, the positive electrode active material particle of the first mode has an O2-type structure, comprises one or more transition metal elements from among Mn, Ni and Co, and is spherical. The spherical positive electrode active material particle is advantageous because when it is present in a positive electrode of a lithium ion secondary battery it becomes easier to limit crystallite growth and reduce the sizes of the crystallites, compared to when non-spherical positive electrode active material particle (such as the aforementioned laminar particle) is present. In other words, with spherical positive electrode active material particle, the reaction resistance tends to be reduced and the diffusion resistance inside the active material tends to be lower, due to the smaller crystallite sizes. The tortuosity is also lowered due to the sphericity, and this is thought to lower lithium ion conductive resistance in the layer forming the positive electrode. As a result, spherical positive electrode active material particle tends to have a superior rate characteristic compared to non-spherical positive electrode active material particle. Such spherical positive electrode active material particle can be produced by the novel method disclosed herein. The method for producing the positive electrode active material particle is described below.

2. Positive Electrode Active Material Particle According to Second Mode

Figure 3:
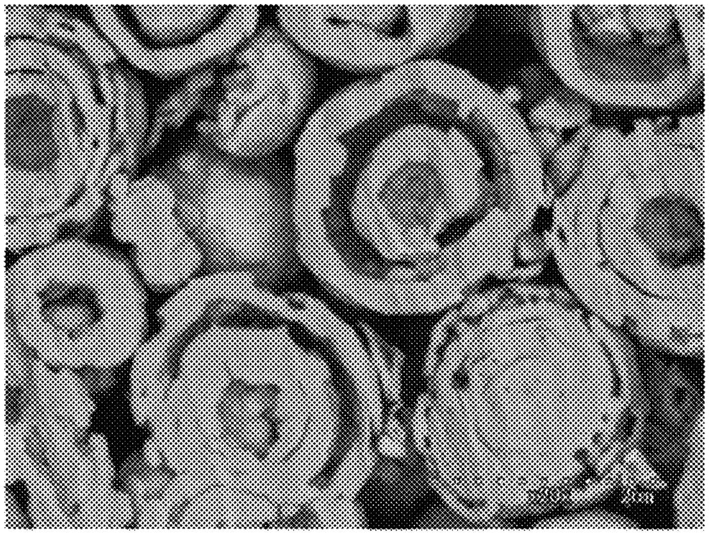
FIG. 3 is a SEM photograph showing exemplary cross-sectional structures of positive electrode active material particles according to a second mode.

FIG. 3 shows an example of the cross-sectional structure of positive electrode active material particles according to a second mode. As shown in FIG. 3, the positive electrode active material particle of the second mode has at least one shell and at least one void in its cross-sectional structure. The shell has an O2-type structure. The shell comprises at least one transition metal element from among Mn, Ni and Co, with Li and O, as constituent elements. The surface of the shell comprises crystallites. The void is present along an inner wall of the shell.

2.1 Shell

As shown in FIG. 3, the positive electrode active material particle of the second mode has at least one shell in its cross-sectional structure. The shell surface comprises crystallites. The shell in the positive electrode active material particle of the second mode may also comprise multiple crystallites connected along the outer peripheries of the particle.

2.1.1 Shell Crystal Structure

The shell includes at least an O2-type structure (belonging to the space group P63mc), as the crystal structure. The shell of the positive electrode active material particle of the second mode may also have an O2-type structure while also having a crystal structure other than an O2-type structure. Examples of crystal structures other than an O2-type structure include a T #2-type structure (belonging to space group Cmca) or an O6-type structure (belonging to space group R-3m, with a c-axis length of 2.5 nm to 3.5 nm and typically 2.9 nm to 3.0 nm, and differing from an O3-type structure which also belongs to space group R-3m), formed when Li is intercalated/deintercalated from an O2-type structure. The shell of the positive electrode active material particle of the second mode may have an O2-type structure as the main phase, or may have a crystal structure other than an O2-type structure as the main phase. The shell of the positive electrode active material particle of the second mode may have a crystal structure for the main phase that changes depending on the state of charge-discharge.

The shell surface comprises multiple crystallites. The sizes of the crystallites forming the shell may be either large or small, but smaller crystallite sizes will result in more surface grain boundaries, helping to exhibit the aforementioned advantageous effects. For example, higher performance can be more easily obtained if the diameters of the crystallites forming the shells are less than 1 μm. The "crystallite" and "crystallite diameter" can be determined by observing the surface of the shell with a scanning electron microscope (SEM). Specifically, the surface of the shell of the positive electrode active material particle is observed and each enclosed region delineated by grain boundaries is considered to be a "crystallite". The circle equivalent diameter is calculated for the crystallite, and considered to be the "crystallite diameter".

In the positive electrode active material particle of the second mode, similar to the first mode, the crystallites forming the shell may have first surfaces exposed on the particle surface, where the first surfaces are flat. That is, the surface of the positive electrode active material particle of the second mode may have the structure shown in FIG. 1B, and specifically it may have a structure with multiple flat sections connected together. During production of the positive electrode active material particle, as explained below, the crystallites are grown along the particle surface until each crystallite is mutually linked with another crystallite, helping to obtain crystallites with flat first surfaces.

When the surface of the shell comprises multiple crystallites, grain boundaries will be present on the shell surface. As mentioned above, the grain boundaries can serve as entry and exit points for intercalation. That is, if the surface of the shell of the positive electrode active material particle comprises multiple crystallites, the ionic conductance may be improved and the diffusion resistance may be lowered.

Multiple crystallites on the shell can form voids at the grain boundaries. The shell can therefore exhibit a liquid-permeable property. This allows liquids to pass from the exterior of the positive electrode active material particle through the shell to the interior, so that liquids can fill the voids inside the positive electrode active material particle. In other words, positive electrode active material particle with shell allows contact of liquids with both the outer surface and inner surface of the shell, thereby increasing the contact area of the positive electrode active material particle with liquids. For example, the electrolyte solution can spread to the interior instead of remaining only on the outer surface of the positive electrode active material particle, thus tending to increase the contact area between the particle and the solution.

2.1.2 Chemical Composition of Shell

The shell of the positive electrode active material particle of the second mode comprises at least one transition metal element from among Mn, Ni and Co, with Li and O, as constituent elements. If at least Li, Mn, one or more from among Ni and Co, and O are included as constituent elements, and especially if at least Li, Mn, Ni, Co and O are included as constituent elements, then the performance of the positive electrode active material particle of the second mode will tend to be even higher. However, the shell of the positive electrode active material particle of the second mode may have a Li abundance of close to 0 since Li is released by charging.

The shell of the positive electrode active material particle of the second mode may have a chemical composition represented by $Li_aNa_bMn_{x-p}Ni_{y-q}Co_{z-r}M_{p+q+r}O_2$. In this formula, $0<a\leq1.00$, $0\leq b\leq0.20$, $x+y+z=1$, and $0\leq p+q+r\leq0.15$. The letter M represents at least one element selected from among B, Mg, Al, K, Ca, Ti, V, Cr, Fe, Cu, Zn, Ga, Ge, Sr, Y, Zr, Nb, Mo and W. If the shell of the positive electrode active material particle has this chemical composition, it will be able to more easily maintain an O2-type structure.

In the chemical composition, "a" may be greater than 0, or 0.10 or greater, 0.20 or greater, 0.30 or greater, 0.40 or greater, 0.50 or greater or 0.60 or greater, and 1.00 or smaller, or smaller, 0.80 or smaller or 0.70 or smaller. In the same chemical composition, "b" may be 0 or greater, 0.01 or greater, 0.02 or greater or 0.03 or greater, and 0.20 or smaller, 0.15 or smaller or 0.10 or smaller. In the same chemical composition, "x" may be 0 or greater, 0.10 or greater, 0.20 or greater, 0.30 or greater, 0.40 or greater or 0.50 or greater, and 1.00 or smaller, or smaller, 0.80 or smaller, 0.70 or smaller, 0.60 or smaller or 0.50 or smaller.

In the same chemical composition, "y" may be 0 or greater, 0.10 or greater or 0.20 or greater, and 1.00 or smaller, 0.90 or smaller, 0.80 or smaller, 0.70 or smaller, 0.60 or smaller, 0.50 or smaller, 0.40 or smaller, 0.30 or smaller or 0.20 or smaller. In the same chemical composition, "z" may be 0 or greater, 0.10 or greater, 0.20 or greater or 0.30 or greater, and 1.00 or smaller, 0.90 or smaller, or smaller, 0.70 or smaller, 0.60 or smaller, 0.50 or smaller, 0.40 or smaller or 0.30 or smaller. M will usually be an element that does not participate in charge-discharge. High charge-discharge capacity will be easier to ensure if p+q+r is 0.15 or smaller. The value of p+q+r may be 0.10 or smaller, or even 0. The composition of 0 is approximately 2, but may be variable without being limited to exactly 2.0.

2.1.3 Shell Shape

The outer shape of the shell are not particularly restricted. For example, when the outer shape (peripheral shape) of the shell is spherical as shown in FIG. 3, the tortuosity is lowered and the rate characteristic tends to be improved, as explained for the first mode. The definition of "spherical" here is the same as explained above. The inner shape (inner peripheral shape) of the shell is not particularly restricted and may correspond to the outer shapes. However, the outer shape and inner shape of the shell do not need to be mutually parallel. The outer shape and inner shape of the shell may also be irregular (concave-convex). The shell may, in addition, have voids or gaps. In other words, the crystallites forming the shell may have defects such as voids and gaps. The shell may also be of a certain thickness. For example, the shell thickness may be 5% or greater and less than 50%, or 5% to 45%, of the diameter of the positive electrode active material particle (circle equivalent diameter).

2.1.4 Number of Shell

The number of shell of the positive electrode active material particle of the second mode may be one, or more than one. The positive electrode active material particle of the second mode may have layered shells as shown in FIG. 3, in which case a void may be present between each shell and another shell. If the positive electrode active material particle has layered shells, then the outsides and insides of the individual shells will be able to contact with liquids, thereby tending to further increase the contact area of the positive electrode active material particle with liquids. When the electrolyte solution has spread to the interior of the positive electrode active material particle, for example, this will tend to increase the contact area between the particle and the electrolyte solution. The phrase "has layered shells" means that at least one shell is present at inner side of another shell. The one shell and the other shell may also be in partial contact or partially bonded. Bonding between the one shell and the other shell may be either physical or chemical bonding.

2.2 Void

As shown in FIG. 3, the cross-sectional structure of the positive electrode active material particle of the second mode includes at least one void along the inner wall of the shell. The void may exist continuously along the entirety of the inner wall of the shell, or it may exist continuously or intermittently along parts of the inner wall of the shell. For example, the void may be present along 20% or greater, 30% or greater, 40% or greater or 50% or greater of the entire inner side of each of the shell. The size of the void is not particularly restricted. Since the shell can exhibit liquid permeability as mentioned above, liquid passing from the exterior of the particle through the shell to the interior of the particle fills the void that is present along the inner wall of the shell, allowing it to contact with the inner wall of the shell. That is, the presence of the void along the inner wall of the shell helps to increase the contact area between the particle and liquid compared to when no void is present. When the electrolyte solution has spread to the interior of the positive electrode active material particle, for example, this will tend to increase the contact area between the particle and the electrolyte solution.

2.3 Core-Shell Structure

As seen in FIG. 3, the positive electrode active material particle of the second mode may be considered to have a core-shell structure. Specifically, the positive electrode active material particle of the second mode may have shell, with core situated inside the shell. The shell is as described above. At least one void may be present along the inner wall of the shell, as shown in FIG. 3. The "core" may consist entirely of the void, or they may be partially formed of the void or may have a second shell, or a solid portion. When the core have portion other than the void, the crystal structure or chemical composition of the portion other than the void may be essentially the same as the crystal structure or chemical composition of the shell.

2.4 Particle Size

The size of the positive electrode active material particle of the second mode are not particularly restricted, but smaller size is more advantageous. For example, the mean particle diameter (D50) of the positive electrode active material particles of the second mode may be 0.1 μm to 10 μm, 0.5 μm to 8.0 μm or 1.0 μm to 6.0 μm. The mean particle diameter (D50) of the positive electrode active material particles is the 50% cumulative particle diameter (D50, median diameter) in the volume-based particle size distribution determined by laser diffraction/scattering.

2.5 Effect (Comparison with Conventional O2-Type Positive Electrode Active Material Particles)

As mentioned above, for Na-containing transition metal oxide particle having a P2-type structure, it has only been possible in the prior art to produce the laminar form with a high aspect ratio with crystal growth direction biased in a specific direction, and as a result, for positive electrode active material particle having an O2-type structure as well, it has only been possible to produce the laminar form. Laminar growth of a P2-type structure follows a basic principle and has been considered unavoidable. Conventionally, therefore, O2-type positive electrode active material particle has been assumed to be laminar, and improvement in its performance as an active material has been achieved by controlling the chemical composition or crystal structure. A common method for increasing the reaction area (area-to-weight ratio) of the particle is to micronize the particle or render it porous, but since it is assumed that O2-type positive electrode active material particle is laminar as mentioned above, the research on micronization or pore formation in the particle has been less than adequate.

In contrast, the positive electrode active material particle of the second mode has at least one shell and at least one void, the shell having an O2-type structure, the shell including one or more transition metal elements from among Mn, Ni and Co, the surface of the shell comprising crystallites, and the void being present along the inner wall of the shell. If such positive electrode active material particle with the shell is included in the positive electrode of the lithium ion secondary battery, then the electrolyte solution will spread to the inner sides of the shell, tending to increase the contact area between the positive electrode active material particle and the electrolyte solution. In other words, positive electrode active material particle with the shell and the void has greater reaction area compared to positive electrode active material particle without shells and voids (such as laminar particle), and also tend to have lower charge transfer resistance. Such positive electrode active material particle with the shell and the void can be produced by the novel method of the present disclosure. The method for producing the positive electrode active material particle is described below.

3. Positive Electrode

Figure 4:
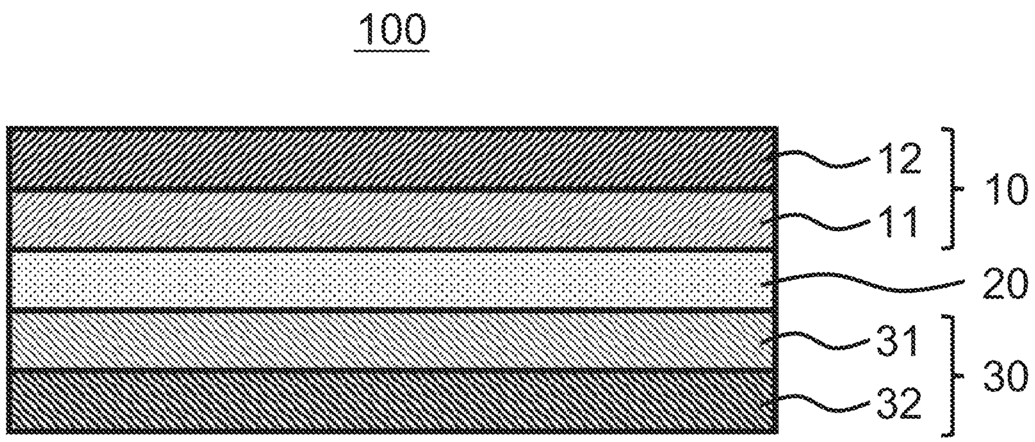
FIG. 4 schematically shows the structure of a lithium ion secondary battery.

Another aspect of the technology of the present disclosure is that the positive electrode contains the aforementioned positive electrode active material. Specifically, the positive electrode of the disclosure comprises either or both positive electrode active material particle of the first mode and positive electrode active material particle of the second mode, as positive electrode active material particle. As shown in FIG. 4, the positive electrode 10 according to one embodiment may comprise a positive electrode active material layer 11 and a positive electrode collector 12. In this case, the positive electrode active material layer 11 may include the aforementioned positive electrode active material particle.

3.1 Positive Electrode Active Material Layer

The positive electrode active material layer 11 may include at least the aforementioned positive electrode active material particle as the positive electrode active material, and optionally also an electrolyte, conductive aid and binder. The positive electrode active material layer 11 may also include other additives. The contents of the positive electrode active material particle, electrolyte, conductive aid and binder in the positive electrode active material layer 11 may be determined as appropriate for the desired battery performance. For example, the content of the positive electrode active material particle may be 40 mass % or greater, 50 mass % or greater or 60 mass % or greater, and 100 mass % or lower or 90 mass % or lower, with respect to 100 mass % as the total positive electrode active material layer 11 (solid content). The form of the positive electrode active material layer 11 is not particularly restricted, and it may be an essentially flat sheet-like positive electrode active material layer 11. The thickness of the positive electrode active material layer 11 is not particularly restricted, and may be 0.1 μm or greater or 1 μm or greater, and 2 mm or smaller or 1 mm or smaller, for example.

3.1.1 Positive Electrode Active Material

The positive electrode active material layer 11 may include the positive electrode active material particle of the present disclosure alone as the positive electrode active material particle. Alternatively, the positive electrode active material layer 11 may include a different type of positive electrode active material (another positive electrode active material) in addition to the positive electrode active material particle of the present disclosure. The content of the other positive electrode active material in the positive electrode active material layer 11 may be a low content from the viewpoint of further increasing the effect of the technology of the disclosure. For example, the content of positive electrode active material particle of the present disclosure may be 50 mass % or greater, 60 mass % or greater, 70 mass % or greater, 80 mass % or greater, 90 mass % or greater, 95 mass % or greater or 99 mass % or greater, based on 100 mass % as the total amount of the positive electrode active material in the positive electrode active material layer 11.

The surface of the positive electrode active material may also be coated with a protective layer comprising a lithium ion conductive oxide. That is, the positive electrode active material layer 11 may include a complex comprising the positive electrode active material and a protective layer formed on its surface. This will help to further inhibit reaction between the positive electrode active material and sulfides (for example, the sulfide solid electrolytes mentioned below). Examples of lithium ion conductive oxides include $Li_3BO_3$, $LiBO_2$, $Li_2CO_3$, $LiAlO_2$, $Li_4SiO_4$, $Li_2SiO_3$, $Li_3PO_4$, $Li_2SO_4$, $Li_2TiO_3$, $Li_4Ti_5O_{12}$, $Li_2Ti_2O_5$, $Li_2ZrO_3$, $LiNbO_3$, $Li_2MoO_4$ and $Li_2WO_4$. The coverage factor (area ratio) of the protective layer may be 70% or greater, 80% or greater or 90% or greater, for example. The thickness of the protective layer may be 0.1 nm or greater, or 1 nm or greater, and 100 nm or smaller or 20 nm or smaller, for example.

3.1.2 Electrolyte

The electrolyte to be optionally included in the positive electrode active material layer 11 may be a solid electrolyte, a liquid electrolyte (electrolyte solution), or a combination thereof. If the positive electrode 10 includes a liquid electrolyte (electrolyte solution), this will increase the contact area between the electrolyte solution and the positive electrode active material particle of the present disclosure to obtain higher performance.

The solid electrolyte used may be one that is publicly known as a solid electrolyte for lithium ion secondary batteries. The solid electrolyte may be an inorganic solid electrolyte or an organic polymer electrolyte. An inorganic solid electrolyte exhibits notably superior ionic conductivity and heat resistance. Examples of inorganic solid electrolytes include oxide solid electrolytes such as lithium lanthanum zirconate, LiPON, $Li_{1+X}Al_XGe_{2-X}(PO_4)_3$, Li—SiO-based glass and Li—Al—S—O-based glass; and sulfide solid electrolytes such as $Li_2S—P_2S_5$, $Li_2S—SiS_2$, $LiI—Li_2S—SiS_2$, $LiI—Si_2S—P_2S_5$, $Li_2S—P_2S_5—LiI—LiBr$, $LiI—Li_2S—P_2S_5$, $LiI—Li_2S—P_2O_5$, $LiI—Li_3PO_4—P_2S_5$ and $Li_2S—P_2S_5—GeS_2$. Sulfide solid electrolytes, and especially sulfide solid electrolytes containing at least Li, S and P as constituent elements, exhibit particularly high performance. The solid electrolyte may be either amorphous or crystalline. The solid electrolyte may be particulate, for example. The solid electrolyte may be of a single type alone, or two or more different types may be used in combination.

The electrolyte solution may include lithium ion as a carrier ion, for example. The electrolyte solution may be an aqueous electrolyte solution or a nonaqueous electrolyte solution. The composition of the electrolyte solution may be a publicly known composition for lithium ion secondary battery electrolyte solutions. For example, a solution of a lithium salt at a certain concentration in a carbonate-based solvent may be used as the electrolyte solution. Examples of carbonate-based solvents include fluoroethylene carbonate (FEC), ethylene carbonate (EC) and dimethyl carbonate (DMC). Examples of lithium salts include $LiPF_6$.

3.1.3 Conductive Aid

Examples of conductive aids to be optionally added in the positive electrode active material layer 11 include carbon materials such as vapor-grown carbon fiber (VGCF), acetylene black (AB), Ketchen black (KB), carbon nanotubes (CNT) and carbon nanofibers (CNF); and metal materials such as nickel, aluminum and stainless steel. The conductive aid may be particulate or filamentous, for example, and its size is not particularly restricted. The conductive aid may be of a single type alone, or two or more different types may be used in combination.

3.1.4 Binder

Examples of binders to be optionally added in the positive electrode active material layer 11 include butadiene rubber (BR)-based binders, butylene rubber (IIR)-based binders, acrylate-butadiene rubber (ABR)-based binders, styrene-butadiene rubber (SBR)-based binders, polyvinylidene fluoride (PVdF)-based binders, polytetrafluoroethylene (PTFE)-based binders and polyimide (PI)-based binders. The binder may be of a single type alone, or two or more different types may be used in combination.

3.2 Positive Electrode Collector

As shown in FIG. 4, the positive electrode 10 may comprise a positive electrode collector 12 in contact with the positive electrode active material layer 11. The positive electrode collector 12 used may be any common one used as a positive electrode collector for a battery. The positive electrode collector 12 may be used as a foil, laminar form, mesh form, punching metal or foam. The positive electrode collector 12 may also be made of a metal foil or metal mesh. A metal foil is particularly suitable in terms of handleability. The positive electrode collector 12 may also comprise a plurality of foils. The metal composing the positive electrode collector 12 may be Cu, Ni, Cr, Au, Pt, Ag, Al, Fe, Ti, Zn, Co or stainless steel. From the viewpoint of ensuring oxidation resistance, the positive electrode collector 12 most preferably contains Al. The positive electrode collector 12 may also have a coating layer on the surface, in order to adjust the resistance. The positive electrode collector 12 may also have metal plated or vapor deposited on a metal foil or base. When the positive electrode collector 12 is made of a plurality of metal foils, it may also have different layers between the plurality of metal foils. The thickness of the positive electrode collector 12 is not particularly restricted. For example, it may be 0.1 μm or greater or 1 μm or greater, or 1 mm or smaller or 100 μm or smaller.

3.3 Other Components

In addition to the structure described above, the positive electrode 10 may further comprise a structure commonly used in secondary battery positive electrodes. For example, it may have a tab or terminals. The positive electrode 10 may be produced by a publicly known method, except for the use of the positive electrode active material particle with an O2-type structure of the present disclosure as the positive electrode active material. For example, a positive electrode mixture containing the components mentioned above may be dry or wet molded to easily form a positive electrode active material layer 11. The positive electrode active material layer 11 may be formed together with the positive electrode collector 12, or it be formed separately from the positive electrode collector 12.

4. Lithium Ion Secondary Battery

As shown in FIG. 4, the lithium ion secondary battery 100 of one embodiment has a positive electrode 10, an electrolyte layer 20 and a negative electrode 30. The positive electrode 10 includes positive electrode active material particle of the present disclosure. The positive electrode active material particle of the present disclosure have an excellent rate characteristic as described above. Including the positive electrode active material particle of the disclosure in the positive electrode of the lithium ion secondary battery 100 will help to improve the performance of the secondary battery 100. The construction of the positive electrode 10 of the lithium ion secondary battery 100 is as described above.

4.1 Electrolyte Layer

The electrolyte layer 20 includes at least an electrolyte. When the lithium ion secondary battery 100 is a solid-state battery (a battery with a solid electrolyte which may be used in partial combination with a liquid electrolyte, or optionally as an all-solid-state battery without a liquid electrolyte), the electrolyte layer 20 may include a solid electrolyte and optionally also a binder. In this case there is no particular restriction on the total content of the solid electrolyte and binder of the electrolyte layer 20. When the lithium ion secondary battery 100 is a liquid electrolyte battery, the electrolyte layer 20 may include a electrolyte solution and may also have a separator to hold the electrolyte solution and to prevent contact between the positive electrode active material layer 11 and the negative electrode active material layer 31. The thickness of the electrolyte layer 20 is not particularly restricted, and may be 0.1 μm or greater or 1 μm or greater, and 2 mm or smaller or 1 mm or smaller, for example.

The electrolyte in the electrolyte layer 20 may be selected as appropriate from among the aforementioned electrolytes that can be included in the positive electrode active material layer. The binder to be optionally included in the electrolyte layer 20 may also be selected as appropriate from among the aforementioned binders that can be included in the positive electrode active material layer. The electrolyte and binder may be of a single type alone, or two or more different types may be used in combination. The separator may be the one commonly used in lithium ion secondary batteries, examples of which include resins such as polyethylene (PE), polypropylene (PP), polyesters and polyamides. The separator may have a monolayer structure or a layered structure. Examples of separators with layered structures include separators with PE/PP two-layer structures, and separators with PP/PE/PP or PE/PP/PE three-layer structures. The separator may be made of a nonwoven fabric such as a cellulose nonwoven fabric, resin nonwoven fabric or glass fiber nonwoven fabric.

4.2 Negative Electrode

As shown in FIG. 4, the negative electrode 30 may comprise a negative electrode active material layer 31 and a negative electrode collector 32.

4.2.1 Negative Electrode Active Material Layer

The negative electrode active material layer 31 includes at least a negative electrode active material, and it may also optionally include an electrolyte, a conductive aid and a binder. The negative electrode active material layer 31 may also include other additives. The contents of the negative electrode active material, electrolyte, conductive aid and binder in the negative electrode active material layer 31 may be determined as appropriate for the desired battery performance. For example, the content of the negative electrode active material may be 40 mass % or greater, 50 mass % or greater or 60 mass % or greater, and 100 mass % or lower or 90 mass % or lower, with respect to 100 mass % as the total negative electrode active material layer 31 (solid content). The form of the negative electrode active material layer 31 is not particularly restricted, and it may be an essentially flat sheet-like negative electrode active material layer. The thickness of the negative electrode active material layer 31 is not particularly restricted, and may be 0.1 μm or greater or 1 μm or greater, and 2 mm or smaller or 1 mm or smaller, for example.

The negative electrode active material used may be any of various substances whose potential for storing and releasing lithium ions (charge-discharge potential) is electronegative compared to the positive electrode active material of the present disclosure. For example, a silicon-based active material such as Si or a Si alloy, or silicon oxide; a carbon-based active material such as graphite or hard carbon; an oxide-based active material such as lithium titanate; or lithium metal or a lithium alloy, may be used. The negative electrode active material may be of a single type alone, or two or more different types may be used in combination.

The form of the negative electrode active material may be any common form used as a negative electrode active material for a battery. The negative electrode active material may be particulate, for example. The negative electrode active material particles may be primary particles, or secondary particles which are aggregates of multiple primary particles. The mean particle diameter (D50) of the negative electrode active material particles may be 1 nm or greater, 5 nm or greater or 10 nm or greater, and 500 μm or smaller, 100 μm or smaller, 50 μm or smaller or 30 μm or smaller, for example. Alternatively, the negative electrode active material may be in a sheet (foil or film) form such as lithium foil. That is, the negative electrode active material layer 31 may be made of a sheet of the negative electrode active material.

The electrolyte to be optionally included in the negative electrode active material layer 31 may be the aforementioned solid electrolyte or electrolyte solution, or a combination thereof. The conductive aid to be optionally included in the negative electrode active material layer 31 may be any of the aforementioned carbon materials or metal materials. The binder to be optionally included in the negative electrode active material layer 31 may be selected as appropriate from among the aforementioned binders that can be included in the positive electrode active material layer 11, for example. The electrolyte, conductive aid and binder may be of a single type alone, or two or more different types may be used in combination.

4.2.2 Negative Electrode Collector

As shown in FIG. 4, the negative electrode 30 may comprise a negative electrode collector 32 in contact with the negative electrode active material layer 31. The negative electrode collector 32 used may be any common one used as a negative electrode collector for a battery. The negative electrode collector 32 may be used as a foil, laminar form, mesh form, punching metal or foam. The negative electrode collector 32 may also be a metal foil or metal mesh, or alternatively a carbon sheet. A metal foil is particularly suitable in terms of handleability. The negative electrode collector 32 may also comprise a plurality of foils or sheets. The metal composing the negative electrode collector 32 may be Cu, Ni, Cr, Au, Pt, Ag, Al, Fe, Ti, Zn, Co or stainless steel. From the viewpoint of ensuring reduction resistance and inhibiting alloying with lithium, the negative electrode collector 32 most preferably includes at least one type of metal selected from among Cu, Ni and stainless steel. The negative electrode collector 32 may also have a coating layer on the surface, in order to adjust the resistance. The negative electrode collector 32 may also have a metal plated or vapor deposited on a metal foil or base. When the negative electrode collector 32 is made of a plurality of metal foils, it may also have different layers between the plurality of metal foils. The thickness of the negative electrode collector 32 is not particularly restricted. For example, it may be 0.1 μm or greater or 1 μm or greater, or 1 mm or smaller or 100 μm or smaller.

4.3 Other Aspects

The lithium ion secondary battery 100 may have the structure described above housed inside an exterior body. The exterior body used may be any publicly known type used as an exterior body for batteries. A plurality of batteries 100 may also be optionally electrically connected and optionally stacked to form a battery assembly. In this case the assembled batteries may be housed inside publicly known battery cases. The lithium ion secondary battery 100 may also be provided with obvious structural parts such as necessary terminals and the like. Examples of forms for the lithium ion secondary battery 100 include coin, laminated, cylindrical and rectilinear battery types.

The lithium ion secondary battery 100 can be produced by a publicly known method. For example, it can be produced in the following manner. However, the method for producing the lithium ion secondary battery 100 is not limited to this method, and each of the layers may be formed by dry molding, for example.

(1) The positive electrode active material that is to form the positive electrode active material layer is dispersed in a solvent to obtain a positive electrode layer slurry. The solvent used may be, but is not limited to, water or an organic solvent. A doctor blade is used to coat the positive electrode layer slurry onto the surface of a positive electrode collector, and it is then dried to form a positive electrode active material layer on the positive electrode collector surface, obtaining a positive electrode.

(2) The negative electrode active material that is to form the negative electrode active material layer is dispersed in a solvent to obtain a negative electrode layer slurry. The solvent used may be, but is not limited to, water or an organic solvent. A doctor blade is used to coat the negative electrode layer slurry onto the surface of a negative electrode collector, and it is then dried to form a negative electrode active material layer on the negative electrode collector surface, obtaining a negative electrode.

(3) Each layer is stacked with the electrolyte layer (solid electrolyte layer or separator) sandwiched between the negative electrode and positive electrode, to obtain a stack having a negative electrode collector, negative electrode active material layer, electrolyte layer, positive electrode active material layer and positive electrode collector in that order. Terminals and other members are attached to the stack as necessary.

(4) The stack is housed in a battery case, the battery case then being filled with electrolyte solution in the case of an electrolyte battery, and the stack inside the battery case is sealed with the stack immersed in the electrolyte solution, to obtain a secondary battery. For an electrolyte battery, the electrolyte solution may be added to the negative electrode active material layer, separator and positive electrode active material layer at stage (3).

5. Method for Producing Positive Electrode Active Material Particle

Figure 5:
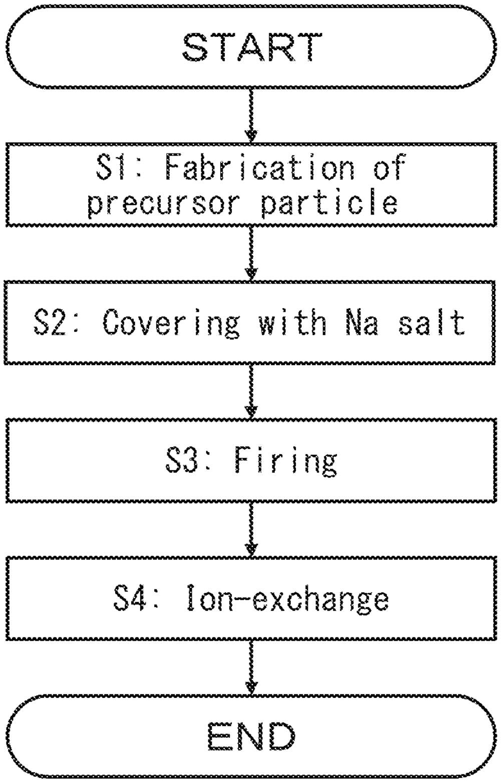
FIG. 5 shows an example of process flow in a method for producing a positive electrode active material particle.

Another aspect of the technology of the present disclosure is a method for producing the positive electrode active material particle. As shown in FIG. 5, the method for producing a positive electrode active material particle according to one embodiment includes:

obtaining a precursor particle (step S1), covering the surface of the precursor particle with a Na salt to obtain a covered particle (step S2), firing the covered particle to obtain Na-containing transition metal oxide particle having a P2-type structure (step S3), and replacing at least a portion of the Na in the Na-containing transition metal oxide particle with Li by ion-exchange to obtain the positive electrode active material particle having an O2-type structure (step S4). The precursor particle is composed of a salt containing one or more transition metal elements from among Mn, Ni and Co, the precursor particle is spherical, the covered particle is obtained by covering 40 area % or more of the surface of the precursor particle with the Na salt, and the Na-containing transition metal oxide particle is spherical.

5.1 Step S1

In step S1, a precursor particle is obtained. The precursor particle is of a salt containing one or more transition metal elements from among Mn, Ni and Co. The precursor particle may be one or more from among carbonates, sulfates, nitrates, acetates and hydroxides, for example. Specifically, it may be a salt represented by $MeCO_3$ (where Me is one or more transition metal elements from among Mn, Ni and Co), or a salt represented by $MeSO_4$, or a salt represented by $Me(NO_3)_2$, or a salt represented by $Me(CH_3COO)_2$, or a compound represented by $Me(OH)_2$. The precursor particle may also include at least one element M selected from among B, Mg, Al, K, Ca, Ti, V, Cr, Fe, Cu, Zn, Ga, Ge, Sr, Y, Zr, Nb, Mo and W, in addition to the transition metal element Me.

In addition, the precursor particle is spherical. The definition of "spherical" here is the same as explained above. If the precursor particle is spherical, then the shape of the finally obtained positive electrode active material particle will also tend to be spherical. The size of the spherical precursor particle are not particularly limited. The spherical precursor particle can be obtained by a solution method such as coprecipitation or a sol-gel method, for example. Specifically, in the case of coprecipitation, an aqueous solution of $MeSO_4$ and an aqueous solution of $Na_2CO_3$ are prepared, mixing each solution dropwise to obtain a precipitate. The precipitate consists of spherical precursor particle represented by $MeCO_3$. A sulfate of M may also be dissolved in the $MeSO_4$ solution to obtain a carbonate including Me and M as precursor particle.

5.2 Step S2

In step S2, the surface of the precursor particle is covered with a Na salt to obtain a covered particle. The covered particle is obtained by covering 40 area % or more of the surface of the precursor particle with the Na salt. The covered particle may also be obtained by covering 50 area % or more, 60 area % or more, or 70 area % of the surfaces of the precursor particle with the Na salt. Examples of Na salts include carbonates and nitrates.

Any of various methods may be used to cover 40 area % or more of the surface of the precursor particle with the Na salt. Examples include tumbling flow coating methods and spray dry methods. Specifically, a coating solution dissolving the Na salt is prepared, and then dried, either simultaneously while contacting the coating solution with the entire surface of the precursor particle, or after contact. The coating conditions (temperature, time, number of coatings) may be adjusted for coverage of 40 area % or more of the surface of the precursor particle with the Na salt. Based on knowledge by the present inventors, a low Na salt coverage factor tends to result in abnormal growth of P2-type crystal on the covered particle surface when the covered particle is fired, making it impossible to obtain the spherical Na-containing transition metal oxide particle. A large Na salt coverage factor allows the P2-type crystal crystallites to be smaller when the covered particle is fired, tending to result in covered particle with more "spherical" shapes corresponding to the shape of the precursor particle. The Na salt coverage of the covered particle may be a sufficient amount (sufficient doping amount of Na) for obtaining a P2-type structure.

5.3 Step S3

In step S3, the covered particle is fired to obtain a Na-containing transition metal oxide particle having a P2-type structure. The Na-containing transition metal oxide particle is spherical at this point. When the Na-containing transition metal oxide particle is not spherical, the positive electrode active material particle subsequently obtained is also not spherical.

The Na-containing transition metal oxide particle comprises one or more transition metal elements from among Mn, Ni and Co, with Na and O, as constituent elements. If at least Na, Mn, one or more from among Ni and Co, and O are included as constituent elements, and especially if at least Na, Mn, Ni, Co and O are included as constituent elements, then the performance of the positive electrode active material particle will tend to be even higher. The Na-containing transition metal oxide particle may have a chemical composition represented by $Na_cMn_{x-p}Ni_{y-q}Co_{z-r}M_{p+q+r}O_2$. In this formula, $0<c\leq1.00$, $x+y+z=1$, and $0\leq p+q+r\leq0.15$. The letter M represents at least one element selected from among B, Mg, Al, K, Ca, Ti, V, Cr, Fe, Cu, Zn, Ga, Ge, Sr, Y, Zr, Nb, Mo and W. With Na-containing transition metal oxide particle having such a chemical composition it is easier to maintain a P2-type structure. In the chemical composition, "c" may be greater than 0, or 0.10 or greater, 0.20 or greater, 0.30 or greater, 0.40 or greater, 0.50 or greater or 0.60 or greater, and 1.00 or smaller, 0.90 or smaller, or smaller or 0.70 or smaller. In the same chemical composition, "x" may be 0 or greater, or greater, 0.20 or greater, 0.30 or greater, 0.40 or greater or 0.50 or greater, and 1.00 or smaller, 0.90 or smaller, 0.80 or smaller, 0.70 or smaller, 0.60 or smaller or 0.50 or smaller. In the same chemical composition, "y" may be 0 or greater, 0.10 or greater or 0.20 or greater, and 1.00 or smaller, 0.90 or smaller, 0.80 or smaller, 0.70 or smaller, 0.60 or smaller, 0.50 or smaller, or smaller, 0.30 or smaller or 0.20 or smaller. In the same chemical composition, "z" may be 0 or greater, 0.10 or greater, 0.20 or greater or 0.30 or greater, and 1.00 or smaller, 0.90 or smaller, 0.80 or smaller, 0.70 or smaller, 0.60 or smaller, 0.50 or smaller, 0.40 or smaller or 0.30 or smaller. M will usually be an element that does not participate in charge-discharge. High charge-discharge capacity will be easier to ensure if p+q+r is 0.15 or smaller. The value of p+q+r may be 0.10 or smaller, or even 0. The composition of O is approximately 2, but is variable without being limited to exactly 2.0.

The firing temperature may be any temperature at which a P2-type structure is formed and the resulting a Na-containing transition metal oxide particle is spherical. If the firing temperature is too low, Na doping will be prevented and it will be difficult to obtain a P2-type structure. If the firing temperature is too high, an O3-type structure will result instead of a P2-type structure. The firing temperature may be 700° C. to 1100° C., or 800° C. to 1000° C., for example.

The firing time may be any time during which the resulting Na-containing transition metal oxide particle becomes spherical. As mentioned above, due to the high Na salt coverage factor on the covered particle in the method of the present disclosure, P2-type crystals with small crystallites on the particle surface tend to form when the covered particle is fired. In the method of the present disclosure, P2-type crystals are grown along the particle surface so that each P2-type crystallite is linked with another P2-type crystallite, to obtain spherical Na-containing transition metal oxide particle. If the firing time is too short, Na doping may not occur and it may not be possible to obtain the desired P2-type structure. If the firing time is too long, on the other hand, excessive growth of a P2-type structure will take place, resulting in laminar particle instead of spherical particle. The present inventors have confirmed that a firing time of 30 minutes to 3 hours is conducive to obtaining the spherical Na-containing transition metal oxide particle. When synthesizing a positive electrode active material by firing, it is generally the case that a longer firing time (such as ≥5 hours) will allow the target crystal phase to be obtained. In the method of the present disclosure, however, the firing time is 3 hours or less, thereby helping to prevent excessive growth of P2-type crystals to obtain the spherical Na-containing transition metal oxide particle. The Na-containing transition metal oxide particle obtained after firing may have a structure with multiple crystallites on its surface, with linkage between the crystallites.

The firing atmosphere is not particularly restricted and may be an oxygen-containing atmosphere such as air, or an inert gas atmosphere, for example.

5.4 Step S4

In step S4, at least some of the Na in the Na-containing transition metal oxide particle is replaced with Li by ion-exchange, to obtain the positive electrode active material particle having an O2-type structure. A method using a lithium halide-containing aqueous solution or a method using a mixture of a lithium halide and another lithium salt (for example, a molten salt) may be used for the ion-exchange. Considering that a P2-type structure is prone to disintegration by infiltration of water, and from the viewpoint of crystallinity, the method using a molten salt is preferred among these two methods. Specifically, the Na-containing transition metal oxide particle having a P2-type structure may be mixed with the molten salt and the mixture may be heated at above the melting point of the molten salt, to replace at least some of the Na of the Na-containing transition metal oxide particle with Li by ion-exchange.

Lithium halide forming a molten salt is preferably at least one from among lithium chloride, lithium bromide and lithium iodide. Another lithium salt to form the molten salt is preferably lithium nitrate. Using a molten salt lowers the melting point and allows ion-exchange at a lower temperature than when using lithium halide or another lithium salt alone.

The temperature for ion-exchange may be above the melting point of the molten salt, and 600° C. or lower, 500° C. or lower, 400° C. or lower or 300° C. or lower, for example. If the temperature for ion-exchange is too high, an O3-type structure will tend to be produced as the stable phase instead of an O2-type structure. However, the ion-exchange temperature is preferably as high as possible from the viewpoint of shortening the time required for ion-exchange.

5.5 Supplement

As mentioned above, replacing some of the Na of the spherical P2-type particle with Li by ion-exchange in the production method of the present disclosure yields the spherical O2-type particle. Specifically, one aspect of the production method of the present disclosure is a method for producing a spherical positive electrode active material particle according to the first mode. Further, in the production method of the present disclosure, replacing some of the Na of the spherical P2-type particle with Li by ion-exchange also tends to cause shrinkage in a uniform manner inside the particle during ion-exchange (shrinkage occurs as the interlayer distance in the crystal structure is shortened as a result of replacing the large ion radius Na with smaller ion radius Li). This is thought to lead to cracking in the circumferential direction of the particle interior, resulting in "shell" formation. If the P2-type particle has non-spherical shapes, shrinkage inside the particle will tend to be non-uniform, which will prevent such shell formation. Specifically, one aspect of the production method of the present disclosure is a method for producing the spherical positive electrode active material particle having at least one shell according to the second mode.

6. Method for Charge-Discharge of Lithium Ion Secondary Battery, and Method for Improving Rate Characteristic of Lithium Ion Secondary Battery One aspect of the technology of the present disclosure is a method for charge-discharge of a lithium ion secondary battery and a method for improving the rate characteristic of a lithium ion secondary battery. Specifically, the method for charge-discharge of a lithium ion secondary battery according to the present disclosure includes using the positive electrode active material particle of the present disclosure in the positive electrode of a lithium ion secondary battery and carrying out charge or discharge of the lithium ion secondary battery, wherein the method includes switching between a relatively low rate of charge or discharge, and a relatively high rate of charge or discharge. The method for improving the rate characteristic of the lithium ion secondary battery of the present disclosure includes using the positive electrode active material particle of the present disclosure in the positive electrode of a lithium ion secondary battery.

7. Vehicle with Lithium Ion Secondary Battery

As mentioned above, including the positive electrode active material particle of the present disclosure in the positive electrode of a lithium ion secondary battery can improve the rate characteristic of the lithium ion secondary battery. A lithium ion secondary battery having such an excellent rate characteristic can be suitably used in one or more types of vehicles selected from among hybrid vehicles (HEV), plug-in hybrid vehicles (PHEV) and battery electric vehicles (BEV). Specifically, one aspect of the technology of the present disclosure is a vehicle with a lithium ion secondary battery, wherein the lithium ion secondary battery has a positive electrode, an electrolyte layer and a negative electrode, and the positive electrode includes the positive electrode active material particle of the present disclosure.

EXAMPLES

Embodiments of the positive electrode active material particle, lithium ion secondary battery and method for producing the positive electrode active material particle of the present disclosure were described above, but the positive electrode active material particle, lithium ion secondary battery and method for producing the positive electrode active material particle of the present disclosure may incorporate various modifications to the embodiments which do not deviate from the gist of the invention. The technology of the present disclosure will now be described in greater detail showing Examples, with the understanding that these Examples are not intended to be limitative in any way.

1. Example 1.1 Fabrication of Precursor Particles (1) After weighing out $MnSO_4 \cdot 5H_2O$, $NiSO_4 \cdot 6H_2O$ and $CoSO_4 \cdot 7H_2O$ to the target compositional ratio, they were dissolved in distilled water to a concentration of 1.2 mol/L to obtain a first solution. In a separate container, $Na_2CO_3$ was dissolved in distilled water to a concentration of 1.2 mol/L to obtain a second solution.

(2) A 500 mL portion of the first solution and a 500 mL portion of the second solution were each added dropwise at a rate of about 4 mL/min into a reactor (with baffle board) already containing 1000 mL of purified water.

(3) Upon completion of the dropwise addition, the mixture was stirred for 1 h at room temperature at a stirring speed of 150 rpm to obtain a product.

(4) The product was washed with purified water and subjected to solid-liquid separation using a centrifugal separator to obtain a first precipitate.

(5) The first precipitate was dried overnight at 120° C. and crushed with a mortar, and then the microparticles were removed out by air classification to obtain precursor particles. The precursor particles were spherical particles composed of transition metal (Mn, Ni and Co) carbonates, with a circularity of 0.98.

1.2 Fabrication of Covered Particles (1) The precursor particles and $Na_2CO_3$ as a Na salt were weighed out to a composition of $Na_{0.7}Mn_{0.5}Ni_{0.2}Co_{0.3}O_2$.

(2) The weighed Na salt and precursor were mixed with a spray dryer. Specifically, the weighed Na salt and precursor were added to a solvent (water), dissolving the Na salt, and the solution of the precursor dispersion was spray dried. The spray drying temperature was 200° C. and the spray pressure was 0.3 MPa. Spray drying produced covered particles having the precursor particle surfaces covered with the Na salt to a 77 area %.

1.3 Fabrication of Na-Containing Transition Metal Oxide Particles Having a P2-Type Structure (1) An alumina crucible was used for firing of the covered particles in an air atmosphere to obtain a first fired body. The firing temperature was 900° C. and the firing time was 1 hour.

Figure 6:
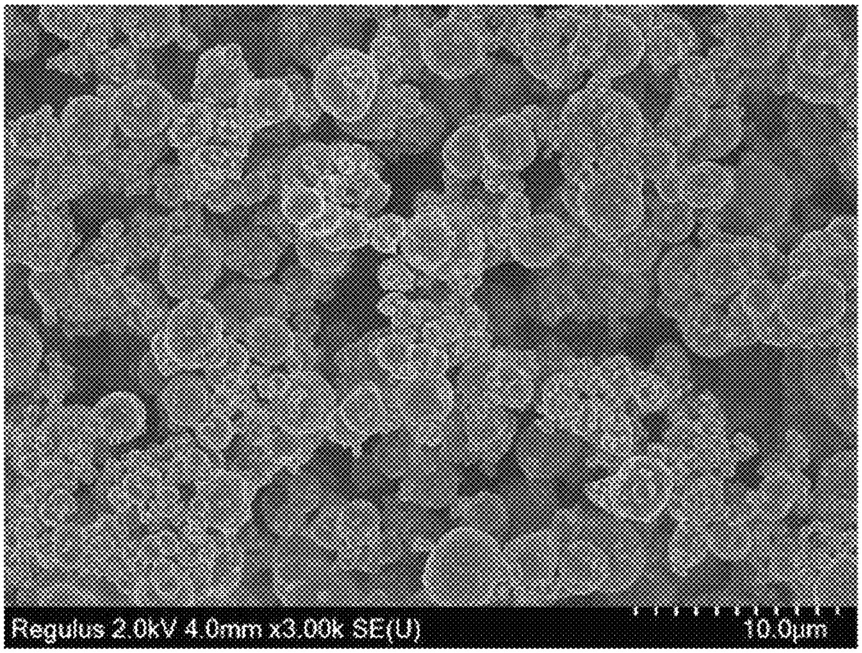
FIG. 6 is a SEM photograph of P2-type particles according to an Example.

(2) The first fired body was shredded using a mortar in a dry atmosphere, to obtain Na-containing transition metal oxide particles having a P2-type structure (P2-type particles), represented by the formula $Na_{0.7}Mn_{0.5}Ni_{0.2}Co_{0.3}O_2$. FIG. 6 shows a SEM photograph of the P2-type particles. The P2-type particles of this Example were spherical particles with a circularity of 0.91.

1.4 Fabrication of Positive Electrode Active Material Particles with O2-Type Structure (1) $LiNO_3$ and LiCl were weighed out to a molar ratio of 50:50 and mixed with the P2-type particles at a molar ratio of 10× the minimum amount of Li necessary for ion-exchange, to obtain a mixture.

(2) An alumina crucible was used for firing of the mixture in an air atmosphere at 280° C. for 1 h to obtain a second fired body.

(3) The salt remaining in the second fired body was washed off with purified water and subjected to solid-liquid separation by vacuum filtration to obtain a second precipitate.

(4) The second precipitate was dried overnight at 120° C. to obtain positive electrode active material particles for the Example.

Figure 7:
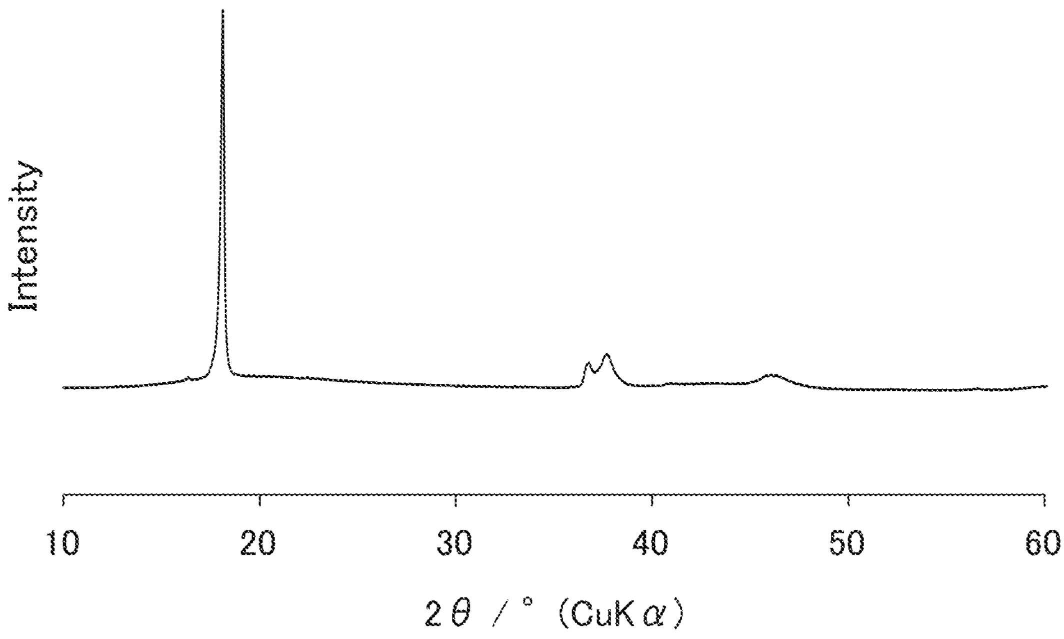
FIG. 7 shows an X-ray diffraction pattern of O2-type positive electrode active material particles according to an Example.

1.5 Positive Electrode Active Material Particle Property Evaluation and Observation FIG. 7 shows an X-ray diffraction pattern of positive electrode active material particles according to an Example. As shown in FIG. 7, the positive electrode active material particles had an O2-type structure belonging to the space group P63mc. Elemental analysis confirmed that the positive electrode active material particles had a chemical composition represented by $Li_{0.63}Mn_{0.5}Ni_{0.2}Co_{0.3}O_2$.

FIGS. 1A and B show SEM photographs of the outer appearance of the positive electrode active material particles of the Example. The positive electrode active material particles were spherical particles with a circularity of 0.85. As shown in FIG. 1B, the surfaces of the positive electrode active material particles comprised crystallites, the crystallite diameters being less than 1 μm. As shown in FIG. 1B, each crystallite had a first surface exposed on the particle surface, the first surface being flat. The mean particle diameter (D50) for the positive electrode active material particles of this Example was 2.6 μm.

FIG. 2 shows a SEM photograph of the cross-sectional structure of the positive electrode active material particles of the Example. As shown in FIG. 2, the positive electrode active material particle had at least one shell and at least one void in its cross-sectional structure. Based on the X-ray diffraction pattern and the elemental analysis results, the shell had an O2-type structure and a chemical composition represented by $Li_{0.63}Mn_{0.5}Ni_{0.2}Co_{0.3}O_2$. For example, the surfaces of the shell may be considered to be composed of crystallites, as shown in FIG. 1B. The void was present along the inner wall of the shell, as shown in FIG. 2.

2. Comparative Example 2.1 Fabrication of Precursor Particles

Spherical precursor particles were fabricated in the same manner as the Example.

2.2 Fabrication of Covered Particles (1) The precursor particles and $Na_2CO_3$ as a Na salt were weighed out to a composition of $Li_{0.63}Mn_{0.5}Ni_{0.2}Co_{0.3}O_2$.

(2) The weighed Na salt and precursor were mixed with a mortar to obtain covered particles where the surfaces of the precursor particles were covered with the Na salt to 28 area %.

2.3 Fabrication of Na-Containing Transition Metal Oxide Particles Having a P2-Type Structure Na-containing transition metal oxide particles having a P2-type structure (P2-type particles) were obtained in the same manner as the Example, except for using the covered particles with a coverage factor of 28 area %. The P2-type particles of this Comparative Example were laminar particles with a circularity of 0.63.

2.4 Fabrication of Positive Electrode Active Material Particles with O2-Type Structure Positive electrode active material particles with an O2-type structure were obtained in the same manner as the Example, except for using the laminar P2-type particles.

2.5 Positive Electrode Active Material Particle Property Evaluation and Observation Upon confirming the X-ray diffraction pattern of the positive electrode active material particles of the Comparative Example, the particles were found to have an O2-type structure belonging to the space group P63mc, similar to the positive electrode active material particles of the Example. Elemental analysis also confirmed that the positive electrode active material particles of the Comparative Example had a chemical composition represented by $Li_{0.63}Mn_{0.5}Ni_{0.2}Co_{0.3}O_2$, similar to the positive electrode active material particles of the Example.

FIG. 2 shows a SEM photograph of the outer appearance of the positive electrode active material particles of the Comparative Example. The positive electrode active material particles of the Comparative Example were laminar particles with an aspect ratio of 2 or greater, and a circularity of 0.64. As shown in FIG. 2, the positive electrode active material particles of the Comparative Example have laminar, coarse growth of each crystallite, with a single crystallite diameter of several μm (>1 μm).

3. Fabrication of Evaluation Cells

Coin cells were fabricated using the positive electrode active material particles of the Example and Comparative Example. The procedure for fabricating the coin cells was as follows.

(1) The positive electrode active material particles, acetylene black (AB) as a conductive aid and polyvinylidene fluoride (PVdF) as a binder were weighed out to a mass ratio of positive electrode active material particles:AB:PVdF=85:10:5 and dispersed and mixed in N-methyl-2-pyrrolidone to obtain a positive electrode mixture slurry. The positive electrode mixture slurry was coated onto an aluminum foil and vacuum dried overnight at 120° C. to obtain a positive electrode as a laminate of a positive electrode active material layer and a positive electrode collector.

(2) TDDK-217 (Daikin Industries, Ltd.) was prepared as an electrolyte solution.

(3) Metal lithium foil was prepared as the negative electrode.

(4) The positive electrode, electrolyte solution and negative electrode were used to fabricate a coin cell (CR2032).

4. Evaluation of Charge-Discharge Characteristic

The coin cells were charged at 0.1 C with a voltage range of 2.0-4.8 V in a thermostatic bath kept at 25° C., and was followed by discharge at 0.5 C, 1 C, 3 C or 5 C, measuring the discharge capacity at each rate. The results are shown in FIG. 8.

Figure 8:
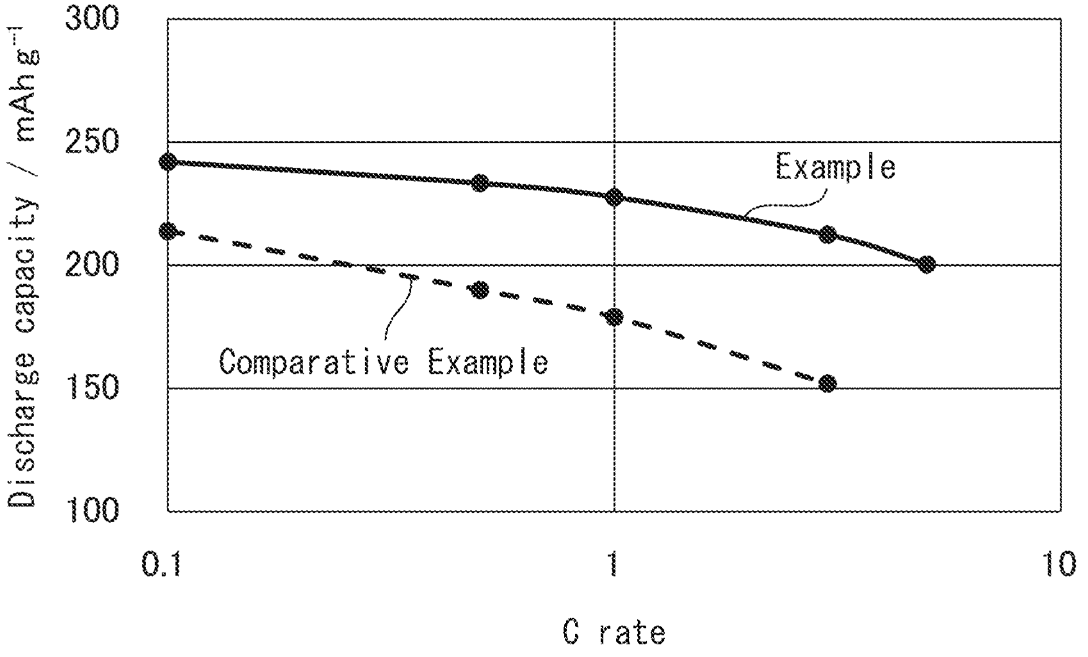
FIG. 8 is a graph comparing rate characteristics for coin cells of an Example and a Comparative Example.

As shown in FIG. 8, the coin cell of the Example had higher discharge capacity compared to the coin cell of the Comparative Example, as well as smaller difference between low rate discharge capacity and high rate discharge capacity, being capable of maintaining high capacity even during high rate discharge. Specifically, the discharge capacity of the coin cell of the Example was 242 mAh/g at 0.1 C and 212 mAh/g at 3 C, whereas the discharge capacity of the coin cell of the Comparative Example coin cell was 214 mAh/g at 0.1 C and 152 mAh/g at 3 C. In other words, the positive electrode active material particles of the Example had a superior rate characteristic compared to the positive electrode active material particles of the Comparative Example.

It is thought that the sphericity of the positive electrode active material particles of the Example resulted in the inhibited crystallite growth, smaller crystallites, lower reaction resistance and lower diffusion resistance inside the active material, compared to the laminar positive electrode active material particles of the Comparative Example. It is also thought that the sphericity lowered the tortuosity, thus also lowering the lithium ion conductive resistance in the layer forming the positive electrode. This also presumably improved the rate characteristic as a result. This confirmed the effect of spheroidization of O2-type positive electrode active material particles.

Moreover, it is thought that since the positive electrode active material of the Example had at least one shell and at least one void in the cross-sectional structure as described above, contact area with the electrolyte solution was increased and charge transfer resistance was reduced compared to the laminar positive electrode active material particles of the Comparative Example, thereby improving the rate characteristic. This confirmed the effect of forming shells and voids in O2-type positive electrode active material particles.

5. Supplement

Positive electrode active material particles having a specific chemical composition were used in the Example described above, but the chemical composition of the positive electrode active material particles of the disclosure is not limited to this Example. Based on knowledge of the present inventors, however, when one or more from among Mn, Ni and Co are present as transition metals, the P2-type structure undergoes crystal growth in a specific direction to form a laminar structure, tending to cause the final resulting O2-type particles to be laminar as well. The problem to be solved by the technology of the present disclosure can therefore be considered especially notable when at least one transition metal from among Mn, Ni and Co is present.

6. Summary

Based on the Example described above, it can be concluded that the positive electrode active material particle satisfying either or both of the following aspects 1 and 2 has an excellent rate characteristic.

(Aspect 1)

A positive electrode active material particle, having an O2-type structure, comprising at least one transition metal elements from among Mn, Ni and Co, with Li and O, as constituent elements, and being spherical.

(Aspect 2)

A positive electrode active material particle having at least one shell and at least one void in the cross-sectional structure, wherein the shell has an O2-type structure, the shell comprises at least one transition metal elements from among Mn, Ni and Co, with Li and O, as constituent elements, the surface of the shell comprises crystallites, and the void is present along the inner wall of the shell.

REFERENCE SIGNS LIST

10 Positive electrode
11 Positive electrode active material layer
12 Positive electrode collector
20 Electrolyte layer
30 Negative electrode
31 Negative electrode active material layer
32 Negative electrode collector
100 Lithium ion secondary battery

The invention claimed is:

1. A positive electrode active material particle, having an O2-type structure, and being spherical, wherein the positive electrode active material particle has a chemical composition represented by the following formula (1):

$$Li_aNa_bMn_{x-p}Ni_{y-q}Co_{z-R}M_{p+q+r}O_2 \quad (1),$$

wherein, in formula (1), $0<a\leq1.00$, $0\leq b\leq0.20$, $x+y+z=1$, and $0\leq p+q+r\leq0.15$, and M is at least one element selected from the group consisting of B, Mg, Al, K, Ca, Ti, V, Cr, Fe, Cu, Zn, Ga, Ge, Sr, Y, Zr, Nb, Mo, and W, and a surface of the positive electrode active material particle comprises a structure with multiple crystallites linked together.

2. The positive electrode active material particle according to claim 1, wherein the positive electrode active material particle comprises Li, Mn, Ni, Co and O as constituent elements.

3. A lithium ion secondary battery having a positive electrode, an electrolyte layer and a negative electrode, wherein the positive electrode comprises the positive electrode active material particle according to claim 1.

4. The lithium ion secondary battery according to claim 3, wherein the positive electrode comprises an electrolyte solution.

* * * * *